(12) United States Patent
Chung et al.

(10) Patent No.: US 10,989,389 B2
(45) Date of Patent: Apr. 27, 2021

(54) LIGHT-ADJUSTING FILM, BACKLIGHT MODULE, AND DISPLAY DEVICE

(71) Applicant: Radiant Opto-Electronics Corporation, Kaohsiung (TW)

(72) Inventors: Yuan-Chen Chung, Kaohsiung (TW); Wei-Hsuan Chen, Kaohsiung (TW); Jui Lin Chen, Kaohsiung (TW); Pin-Hsun Lee, Kaohsiung (TW); Ruei-Lin Huang, Kaohsiung (TW); Yi-Nan Su, Kaohsiung (TW)

(73) Assignee: RADIANT OPTO-ELECTRONICS CORPORATION, Kaohsiung (TW)

( * ) Notice: Subject to any disclaimer, the term of this patent is extended or adjusted under 35 U.S.C. 154(b) by 0 days.

(21) Appl. No.: 16/879,037

(22) Filed: May 20, 2020

(65) Prior Publication Data
US 2021/0033260 A1    Feb. 4, 2021

(30) Foreign Application Priority Data
Jul. 29, 2019  (TW) .................................. 108126737

(51) Int. Cl.
*F21V 5/02* (2006.01)
*F21V 3/04* (2018.01)
*F21V 13/02* (2006.01)
*F21Y 115/10* (2016.01)

(52) U.S. Cl.
CPC .................. *F21V 5/02* (2013.01); *F21V 3/049* (2013.01); *F21V 13/02* (2013.01); *F21Y 2115/10* (2016.08)

(58) Field of Classification Search
CPC .......... F21Y 2115/10; F21K 9/64; F21V 9/30; H01J 1/68; G02B 6/005; G02B 6/0051; G02F 1/133603; G02F 1/133609; G02F 2001/133614; G02F 1/133606; G02F 2001/133624
See application file for complete search history.

(56) References Cited

U.S. PATENT DOCUMENTS

| | | | | |
|---|---|---|---|---|
| 10,139,676 B2 * | 11/2018 | Shin | .................. | G02F 1/133603 |
| 10,386,678 B2 * | 8/2019 | Cho | ...................... | G02B 6/0088 |
| 10,534,118 B2 * | 1/2020 | Gao | .................. | G02F 1/133621 |
| 2016/0137918 A1 * | 5/2016 | Hori | ....................... | G02F 1/1336 428/1.1 |
| 2016/0307519 A1 * | 10/2016 | Chen | ...................... | G02B 6/005 |

(Continued)

FOREIGN PATENT DOCUMENTS

| CN | 102661544 A | 9/2012 |
|---|---|---|
| CN | 107110446 A | 8/2017 |

(Continued)

*Primary Examiner* — Peggy A Neils
(74) *Attorney, Agent, or Firm* — Birch, Stewart, Kolasch & Birch LLP (57) ABSTRACT

A light-adjusting film is mounted between a color conversion layer and a display panel of a direct type backlight module and has a substrate and at least one light-adjusting layer. The substrate has a central area and a surrounding area. The at least one light-adjusting layer has a pigment and is mounted on the substrate. A content of the pigment is gradually decreased from the surrounding area to the central area. The color of the pigment of the light-adjusting film is a correction color of lights emitted from light emitting surface of the color conversion layer in the backlight module.

16 Claims, 8 Drawing Sheets

(56) References Cited

U.S. PATENT DOCUMENTS

2018/0039006 A1\* 2/2018 Gotou ............... G02F 1/133603
2020/0249530 A1\* 8/2020 He .................... G02F 1/133603

FOREIGN PATENT DOCUMENTS

| | | |
|---|---|---|
| CN | 207424291 U | 5/2018 |
| CN | 208141087 U | 11/2018 |
| CN | 210573093 U | 5/2020 |
| TW | 200426409 A | 12/2004 |
| TW | 201809764 A | 3/2018 |
| WO | WO 2019/107821 A1 | 6/2019 |

\* cited by examiner

LIGHT-ADJUSTING FILM, BACKLIGHT MODULE, AND DISPLAY DEVICE

BACKGROUND OF THE INVENTION

1. Field of the Invention

The present invention relates to a light-adjusting film, and more particularly to a light-adjusting film applied for a direct type backlight module for a display device.

2. Description of Related Art

In a display device, a backlight module serves as a surface emitting device for a display panel. A conventional backlight module for the display device maybe a direct type or an edge type based on a light incoming direction. A conventional direct type backlight module comprises a housing, a light source mounted in the housing, and optical films, such as prism sheets or diffusion sheets to provide the surface emitting device to the display panel.

The light source of the conventional direct type backlight module could be one of the following options, one is red/green/blue light emitting diodes (RGB LEDs), and the other is blue LEDs. The lights emitted from the RGB LEDs pass through the optical films to mix as white light by diffusion, reflection, or refraction. In another way is, the blue light emitted from the blue LEDs excites a quantum dot film to emit white light. However, uneven mixture of lights will occur on a peripheral area of the backlight module because of less times of reflections or refractions.

Therefore, how to solve the problem of chromatic aberration caused by uneven mixture of lights is necessary.

To overcome the shortcomings, the present invention tends to provide a light-adjusting film to mitigate or obviate the aforementioned problem.

SUMMARY OF THE INVENTION

The main objective of the invention is to provide a light-adjusting film to solve the problem of chromatic aberration caused by uneven mixture of lights.

The light-adjusting film is mounted between a color conversion layer and a display panel of a direct type backlight module, and the light-adjusting film has a substrate and at least one light-adjusting layer with a pigment mounted on the substrate. The substrate has a central area and a surrounding area, wherein an amount of the pigment is gradually decreased from the surrounding area to the central area, and wherein the color of the pigment of the light-adjusting film is a correction color of lights emitted from light emitting surface of the color conversion layer in the backlight module.

Other objects, advantages and novel features of the invention will become more apparent from the following detailed description when taken in conjunction with the accompanying drawings.

DETAILED DESCRIPTION OF PREFERRED EMBODIMENT

With reference to FIGS. 1 to 10, a light-adjusting film 10 in accordance with the present invention is mounted between a color conversion layer 23 of a direct type backlight module 20 and a display panel 31. The light-adjusting film 10 comprises a substrate 11 and at least one light-adjusting layer 12*a* to 12*e* with pigments. The substrate 11 has a central area 13 and a surrounding area 14 surrounding the central area 13. For example, the at least one light-adjusting layer 12*a* to 12*e* is optionally formed via spreading gel with pigments or printing pigments on the substrate 11. For one example, UV gel is spread on the substrate 11 and formed with a mold. For another example, with reference to FIG. 8, the light-adjusting layer 12*e* is printed onto the substrate 11 in a color gradient manner.

Preferably, the substrate 11 has two opposite sides, and the light-adjusting layer 12*a* to 12*e* is optionally formed on at least one or two of the opposite sides of the substrate 11.

Figure 3:
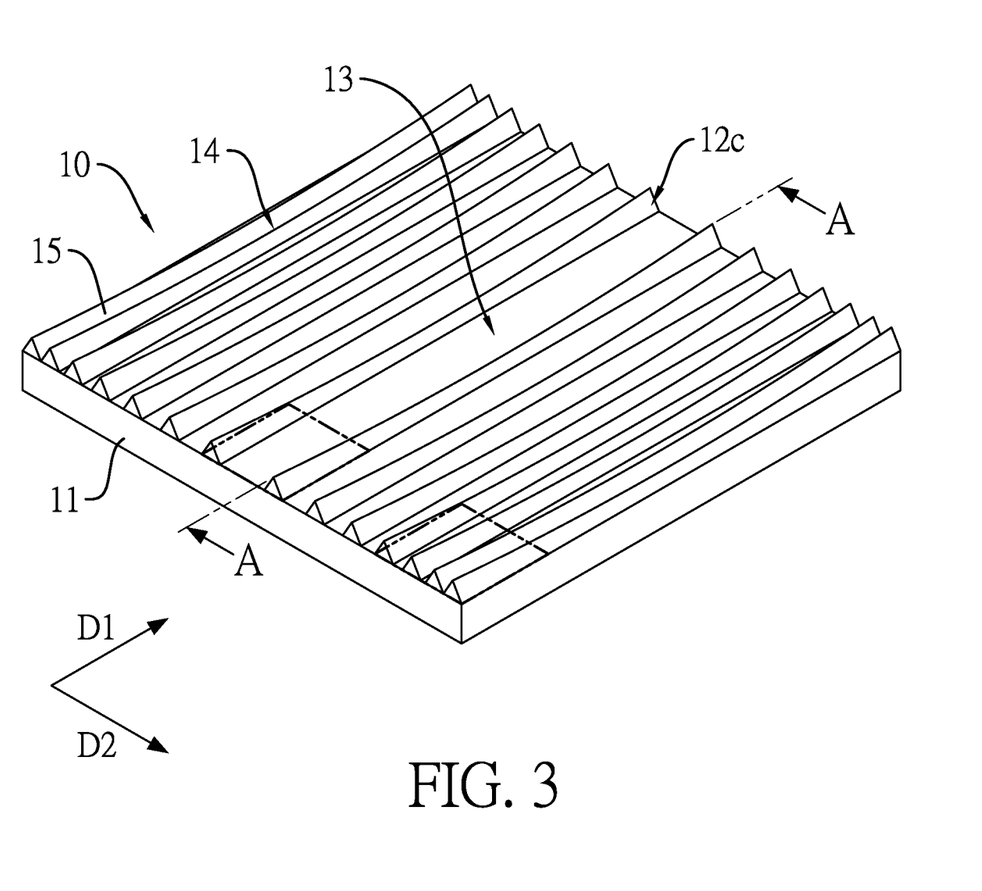
FIG. 3 is a perspective view of a third embodiment of a light-adjusting film in accordance with the present invention.
Figure 6:
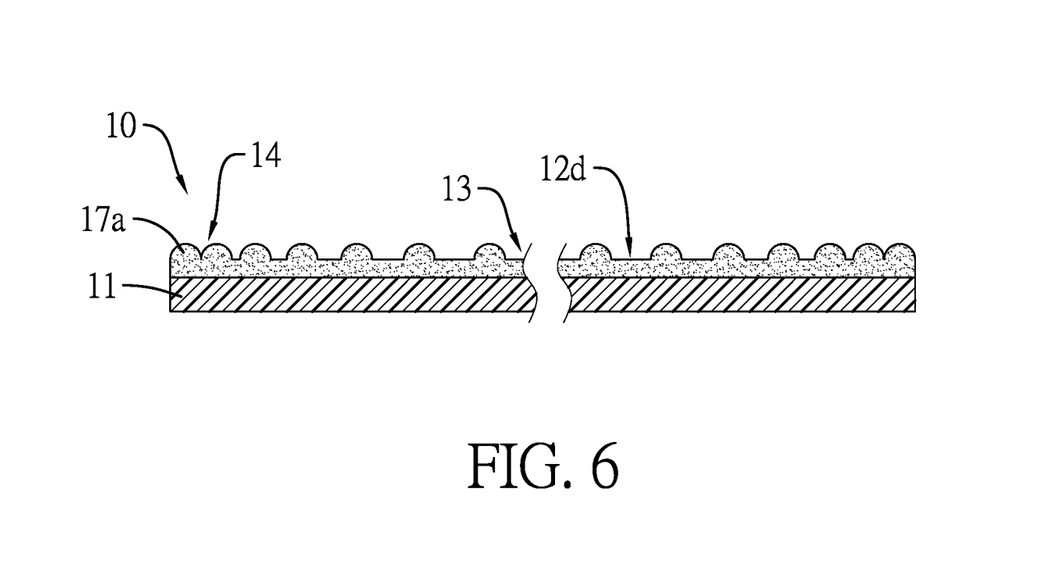
FIG. 6 is a cross sectional side view of a fifth embodiment of a light-adjusting film in accordance with the present invention.
Figure 7:
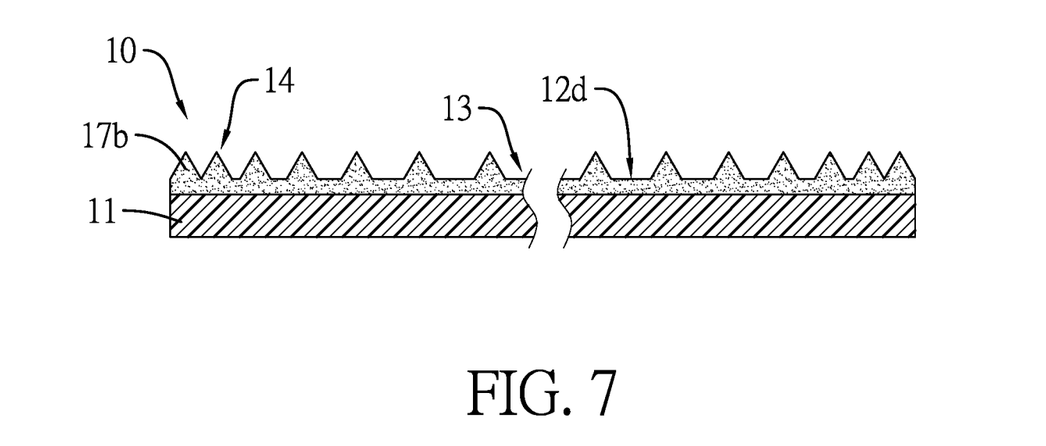
FIG. 7 is a cross sectional side view of a sixth embodiment of a light-adjusting film in accordance with the present invention.

Preferably, the amount of the pigment of each light-adjusting layer 12*a* to 12*e* is gradually reduced from the surrounding area 14 toward the central area 13. More specifically, the concentration of the pigment in the light adjusting layer 12*a* to 12*e* is homogeneous, the way of adjusting the amount of the pigment in the following embodiments is via the thickness of the light-adjusting layer 12*a* to 12*e*, the spaced intervals between ribs 15 (FIG. 3), the size of microstructures 17*a* or 17*b*, or the arrange density of microstructures 17*a* or 17*b* (FIG. 6 or FIG. 7). The light-adjusting layer 12*a* to 12*e* is divided into several units in area by imaginary lines (FIG. 3). According to the location of the unit that nearing the surrounding area 14 or the central area 13, the amount of the pigment corresponding to a unit in area is gradually reduced from the surrounding area 14 toward the central area 13.

The color of the pigment of the at least one light-adjusting layer 12*a* to 12*e* is a correction color of lights emitted from the color conversion layer 23 of the backlight module. For example, if the emitting light tends to blue, the correction color of the pigment is a compensatory color of blue, which is yellow. In the first to fourth embodiments, the amount of the pigment of the light-adjusting layer 12*a* to 12*d* gradually reduced from the surrounding area 14 to the central area 13 is achieved by different thickness of the light-adjusting layer 12a to 12d or spaced intervals of ribs or microstructures of the light-adjusting layer 12a to 12d. The method is mainly to spread a pigment-containing gel (for example, UV gel) on the substrate 11, and then form the light-adjusting layers 12a to 12d on the substrate 11 with an appropriate mold. Due to the fast curing speed of UV gel, it can save the drying time and improve the production efficiency.

Figure 1:
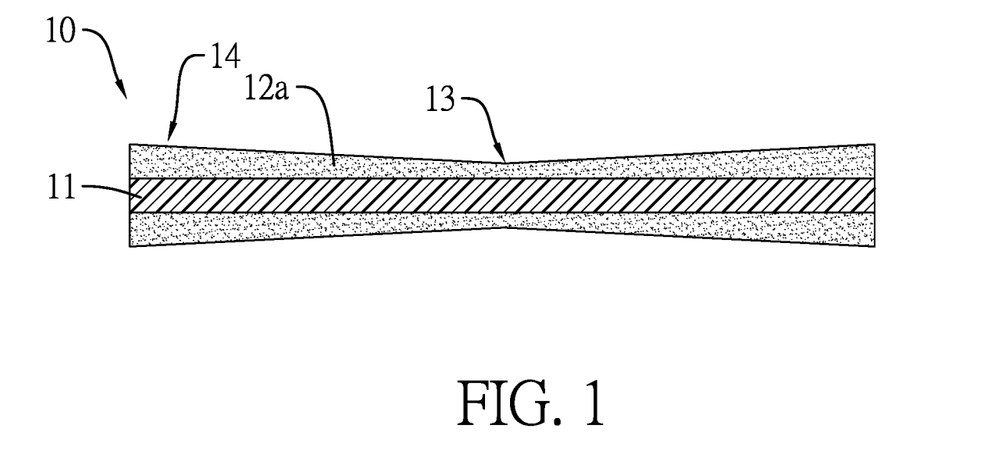
FIG. 1 is a cross sectional side view of a first embodiment of a light-adjusting film in accordance with the present invention.

With reference to FIG. 1, in the first embodiment, the thickness of the light-adjusting layer 12a is gradually decreased from the surrounding area 14 to the central area 13. With the change of the thickness of the light-adjusting layer 12a, the pigment-exposure amount of the light passing in the surrounding area 14 is more than in the central area 13, such that the light-adjusting effect between the central area 13 and the surrounding area 14 can be tuned.

Figure 2:
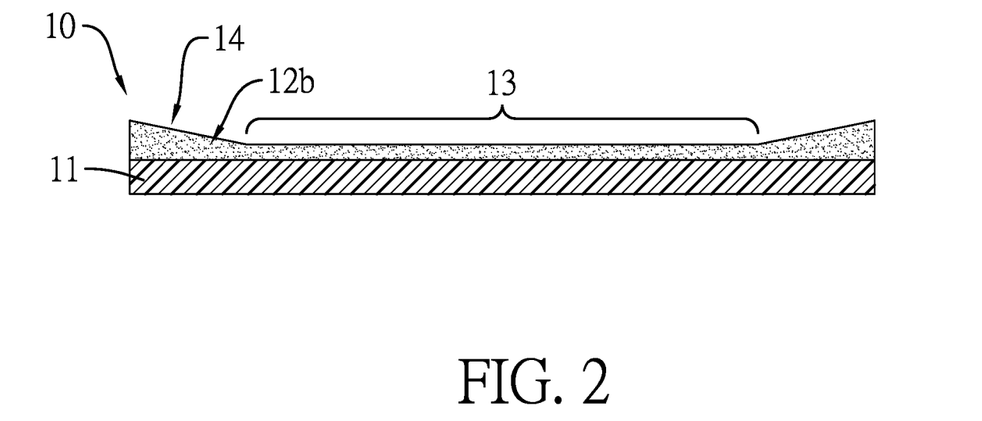
FIG. 2 is a cross sectional side view of a second embodiment of a light-adjusting film in accordance with the present invention.

With reference to FIG. 2, in the second embodiment, the thickness of the light-adjusting layer 12b is gradually decreased from the surrounding area 14 to the central area 13, and the central area 13 is a flat surface. The pigment in the central area 13 is evenly distributed. With the change of the thickness of the light-adjusting layer 12b, the pigment-exposure amount of the light passing in the surrounding area 14 is more than that in the central area 13, such that the light-adjusting effect of the surrounding area 14 can be enhanced.

With reference to FIG. 3, in the third embodiment, the substrate 11 has a first direction D1 and a second direction D2 perpendicular to the first direction D1. The light-adjusting layer 12c comprises multiple ribs 15 being parallel with each other, extending along the first direction D1 of the substrate 11, and arranged along the second direction D2 of the substrate 11.

Figure 4:
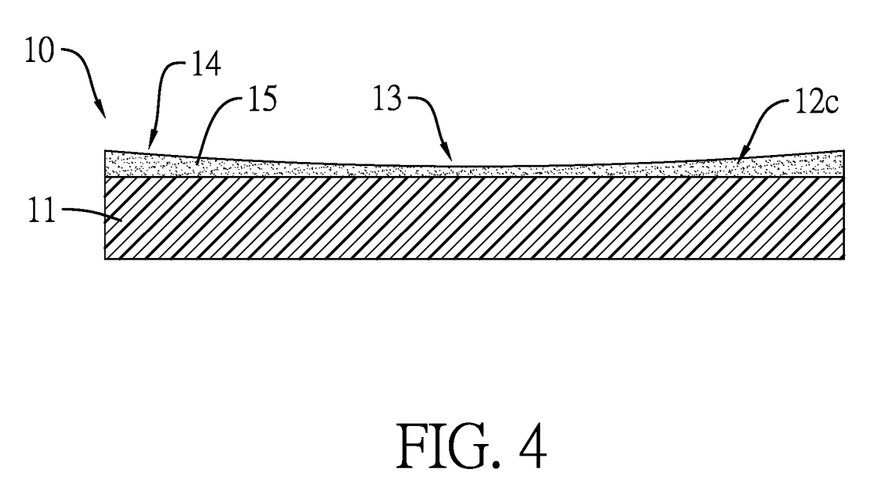
FIG. 4 is a cross sectional side view of the light-adjusting film along a line A-A in FIG. 3.

With further reference to FIG. 4, a thickness of each rib 15 is gradually decreased from two ends to a middle segment of the rib 15. In addition, as shown in FIG. 3, spaced intervals between any adjacent two of the ribs 15 are gradually increased from the surrounding area 14 to the central area 13 along the second direction D2 of the substrate 11. With the changes of the thickness and spaced intervals of the ribs 15, the amount of the pigment in the surrounding area 14 and the central area 13 can be tuned, so as to slightly adjust the light-adjusting effect between the surrounding area 14 and the central area 13.

Figure 5:
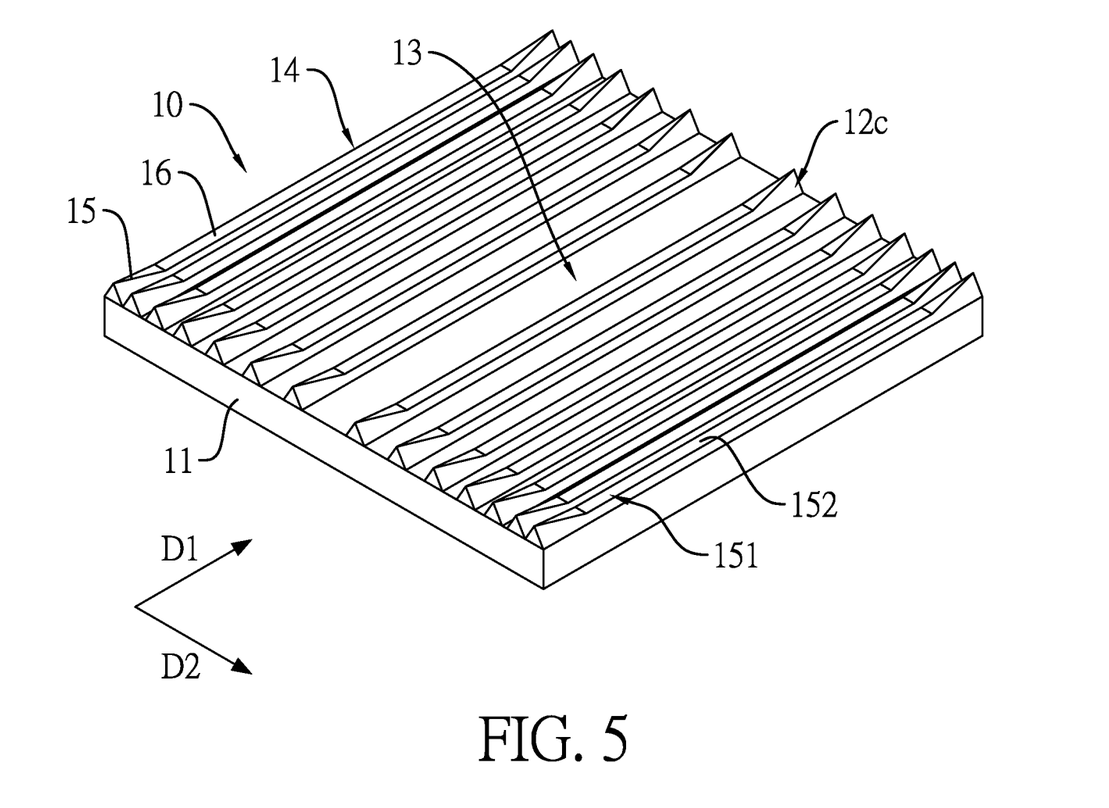
FIG. 5 is a perspective view of a fourth embodiment of a light-adjusting film in accordance with the present invention.

In addition, on the premise of without influencing the light quantity, with reference to FIG. 5, each rib 15 has a middle segment 151, and the middle segment 151 has a flat top surface 152. Alternatively, each rib 15 is inverted V-shaped at cross-section and has a curved top edge. The flat top surface 152 or the curved top edge of the rib 15 is applied to avoid scratching optical films above.

With reference to FIGS. 6 and 7, in the fourth embodiments, multiple microstructures 17a, 17b are disposed on a position of the light-adjusting layer 12d corresponding to the surrounding area 14. For example, each microstructure 17a, 17b may be semi-spherical or conical in shape at cross-section. The arrange density of the microstructures 17a, 17b is gradually reduced from an outer edge of the surrounding area 14 toward the central area 13. In the invention, the arrange density is used to describe the number of microstructures in a unit area. In the embodiments, spaced intervals between the microstructures 17a, 17b are gradually increased from the outer edge of the surrounding area 14 toward the central area 13. With the changes of the densities and spaced intervals of the microstructures 17a, 17b, the amount of pigment between central area 13 and the surrounding area 14 can be tuned. Thus, the light adjusting effects of the central area 13 and the surrounding area 14 can also be tuned to reduce the color differences between the central area 13 and the surrounding area 14. In other embodiments, the way of adjusting the amount of the pigment between the surrounding area 14 and the central area 13 is by decreasing the size of the microstructures 17a, 17b from that in the surrounding area 14 to that in the central area 14, instead of changing the spaced interval of the microstructures 17a, 17b in the central area 13 or in the surrounding area 14. Similarly, by means of gradually decreasing the amount of the pigment from the outer edge of the surrounding area 14 toward the central area 13, the light adjusting effects of the central area 13 and the surrounding area 14 also can be tuned, and the color differences between the central area 13 and the surrounding area 14 can be reduced.

Figure 8:
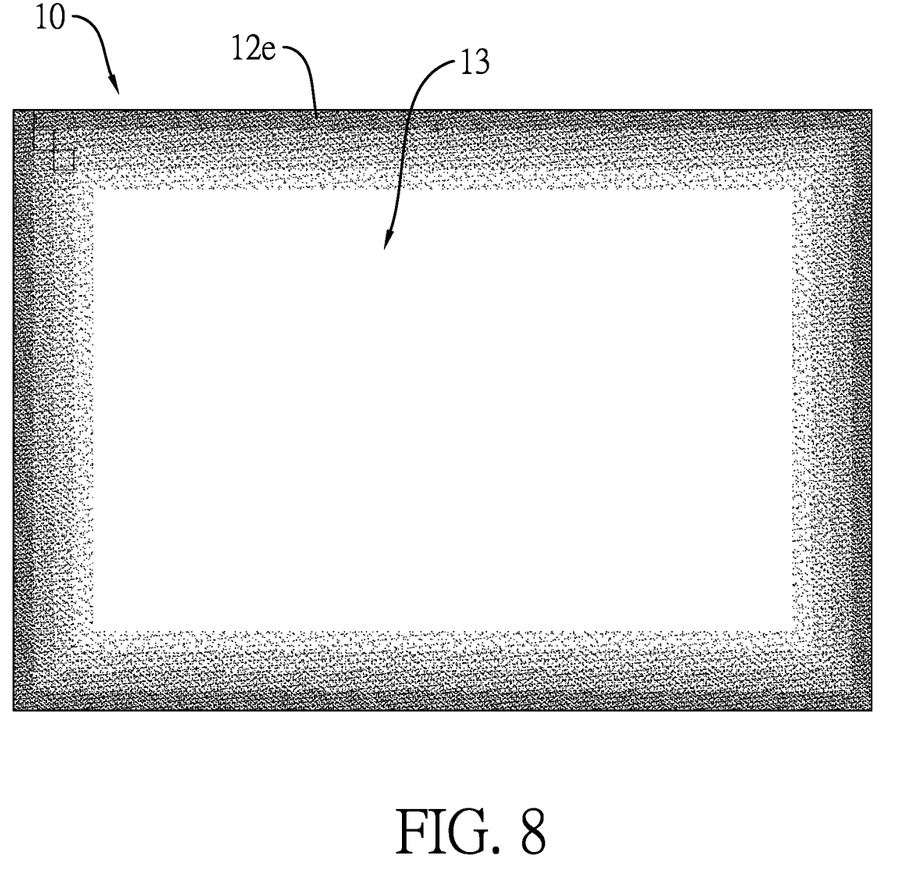
FIG. 8 is a top view of a seventh embodiment of a light-adjusting film in accordance with the present invention.

With reference to FIG. 8, in the fifth embodiment, the light-adjusting layer 12e is formed on the substrate 11 by color printing. The pigment is printed onto a bottom of an optical film 24 in a color gradient manner, wherein the amount of the pigment for the light-adjusting layer 12e is gradually decreased from the outer edge toward the inner edge of the surrounding area 14, and the central area 13 is blank and kept from being printed. More specifically, the manufacturing of the light-adjusting layer 12e of the fifth embodiment is via a method of screen printing to design the arrangement density or size of mesh, so that the amount of pigment per unit in area (imaginary lines in FIG. 8) gradually reduces from the surrounding area 14 to the central area 13. In this way, even if the thickness of the light-adjusting layer 12e does not change, through the gradual distribution of printed dots or the change of printed dot size of the pigments of the same concentration, the color-different problem of uneven mixture of lights on the peripheral area is solved to improve the overall optical quality of the backlight module. This method is mainly carried out by screen printing, which has the advantages of costs less, timeliness of revision or shorter process time.

Figure 9:
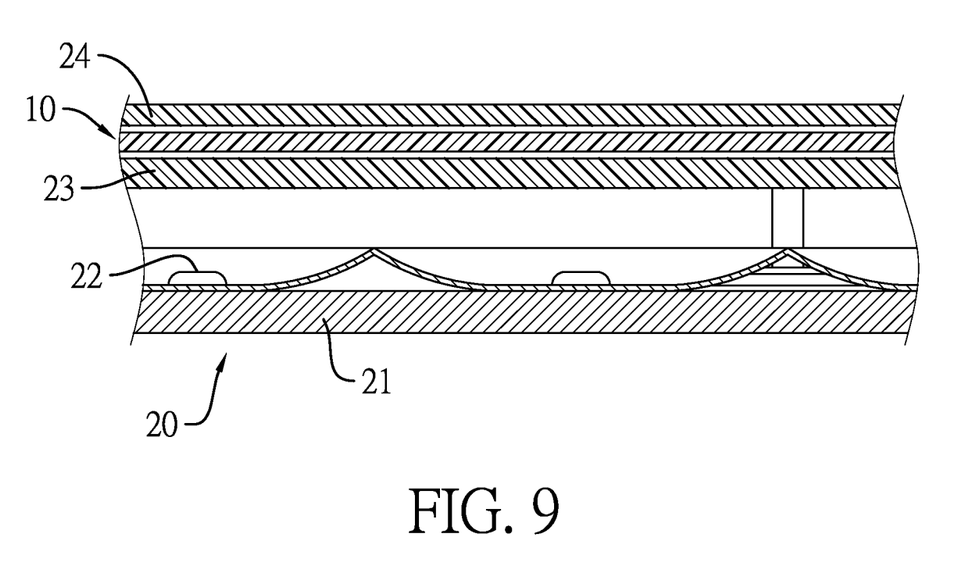
FIG. 9 is a cross sectional side view of a backlight module in accordance with the present invention.

With reference to FIG. 9, a backlight module 20 in accordance with the present invention comprises a housing 21, a light source 22, a color conversion layer 23, and the aforementioned light-adjusting film 10.

The light source 22 is mounted in the housing 21. For example, the light source 21 is chosen as blue LEDs, preferably the blue LEDs arranged in a matrix and disposed inside the housing 21.

The color conversion layer 23 is mounted in the housing 21 and is located at a front of the light source 22. The color conversion layer 23 has two opposite sides, one side facing the light source 22 is defined as the light incident surface and the other side defined as the light emitting surface. The color conversion layer 23 is applied to convert the color of the light emitted from the light source 22. For example, the light source 22 is chosen as blue LEDs, and the color conversion layer 23 is chosen as a quantum dot film which is excited by blue light and emits white light.

The light-adjusting film 10 is mounted on a front of the color conversion layer 23 and is mounted above the light emitting surface of the color conversion layer 23. The color of the pigment of the light-adjusting film 10 is a correction color of lights emitted from light emitting surface of the color conversion layer 23 in the backlight module 20. For example, the light source 22 is chosen as blue LEDs to emit a blue light, and the blue light is converted to a white light by the color conversion layer 23. Unfortunately, there is a color difference between the light emitting from the color conversion layer 23 near the surrounding area 14 and the central area 13, caused by insufficient light mixture, and the color difference usually tends in blue. The light tend in blue can be adjusted by choosing a complementary color in the pigment of the light-adjusting film. In this embodiment, the pigment is yellow, so as to achieve an even light mixture effect. Thus, the optical quantity of the backlight module can be enhanced.

In addition, the backlight module 20 further comprises at least one optical film 24 mounted on a front of the light-adjusting film 10. The at least one optical film 24 may include a prism sheet, a diffusion sheet or the like. The amount and sequence of at least one optical film 24 can be designed based on different needs. Preferably, the bottom of the optical film 24 includes the design of the aforementioned light-adjusting film 10, and the substrate 11 is an optical film with excellent light transmission, such as a prism sheet or a brightness enhancement film. The optical film has a light-adjusting layer 12a to 12e as shown in FIGS. 1 to 7 mounted on a bottom of the optical film. The light-adjusting layer 12a to 12e may be formed by color gel, such as UV gel being shaped with a mold, or may be formed by a color printing in a color gradient manner as shown in FIG. 8. Preferably, the light source 22 is chosen as blue LEDs, the pigment is chosen as yellow and the concentration of the pigment is gradually decreased from the surrounding area 14 toward the central area 13.

Figure 10:
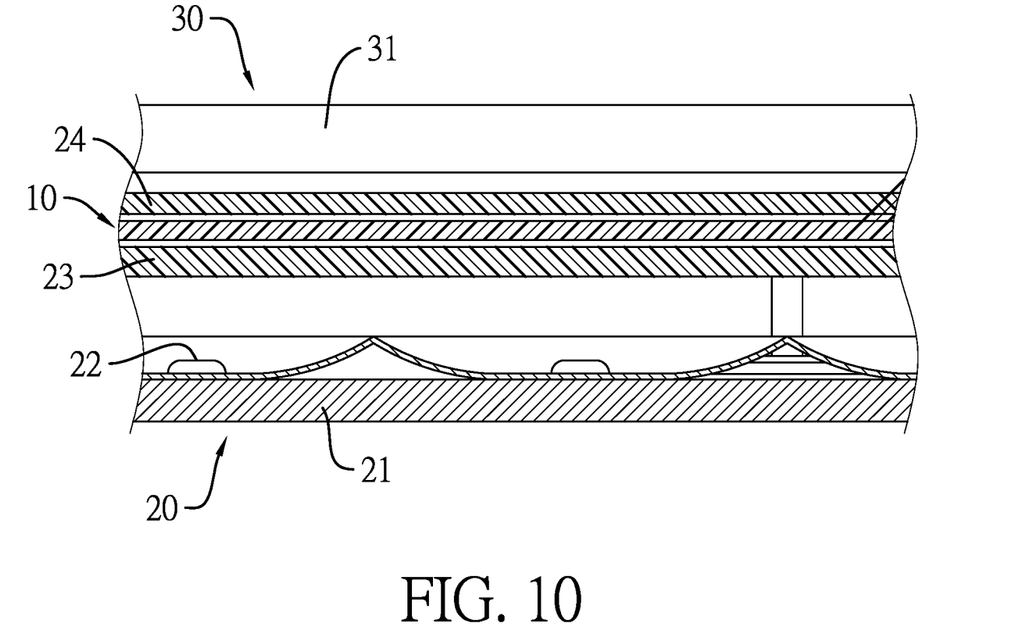
FIG. 10 is a cross sectional side view of a display device in accordance with the present invention.

With reference to FIG. 10, the display device 30 in accordance with the present invention comprises the aforementioned backlight module 20 and a display panel mounted on a front of the backlight module 20.

The light-adjusting film 10 in accordance with the present invention comprises a light-adjusting film 12a to 12e mounted on a substrate 11. With the changes of the thickness of the light-adjusting layer 12a to 12e or spaced intervals of ribs 15 or microstructures 17a to 17b of the light-adjusting layer 12a to 12e, or with the manner of color gradient printing, the amount of pigment of the light-adjusting layer 12a to 12e is gradually decreased from the surrounding area 14 toward the central area 13. With the difference of the amount of the pigment between the surrounding area 14 and the central area 13, a light adjustment effect can be achieved by the pigment of the light-adjusting layer 12a to 12e when the light emitted from the light source 22 passes through the light-adjusting layer 12a to 12e. Thus, the evenness of light mixture on the peripheral area of the backlight module 20 and the light quantity of the backlight module 20 can be enhanced.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A light-adjusting film adapted to be mounted between a color conversion layer and a display panel of a direct type backlight module, the light-adjusting film comprising:
    a substrate having a central area and a surrounding area; and
    at least one light-adjusting layer with a pigment formed on the substrate in a gradient manner, wherein an amount of the pigment is gradually decreased from the surrounding area to the central area, and wherein the color of the pigment of the light-adjusting film is a correction color of lights emitted from light emitting surface of the color conversion layer in the backlight module.

2. The light-adjusting film as claimed in claim 1, wherein the at least one light-adjusting layer includes two light-adjusting layers mounted respectively on two sides of the substrate.

3. The light-adjusting film as claimed in claim 1, wherein each one of the at least one light-adjusting layer has a thickness gradually decreased from the surrounding area to the central area.

4. The light-adjusting film as claimed in claim 1, wherein
    the substrate has a first direction and a second direction perpendicular to the first direction; and
    each one of the at least one light-adjusting layer comprises multiple ribs being parallel with each other, extending along the first direction of the substrate, and arranged along the second direction of the substrate.

5. The light-adjusting film as claimed in claim 4, wherein spaced intervals between any two of the ribs of the at least one light-adjusting layer are gradually increased from the surrounding area to the central area.

6. The light-adjusting film as claimed in claim 4, wherein each rib of the at least one light-adjusting layer has a thickness gradually decreased from two ends to a middle segment of the rib.

7. The light-adjusting film as claimed in claim 6, wherein the middle segment of each rib has a flat top surface.

8. The light-adjusting film as claimed in claim 6, wherein each rib is inverted V-shaped with a curved top edge.

9. The light-adjusting film as claimed in claim 1, wherein the at least one light-adjusting layer includes multiple microstructures disposed on a position of the light-adjusting layer corresponding to the surrounding area of the substrate, and an arrange density of the microstructures of the at least one light-adjusting area is gradually reduced from an outer edge of the surrounding area toward the central area.

10. The light-adjusting film as claimed in claim 9, wherein sizes of the microstructures of the at least one light-adjusting layer are gradually decreased from the outer edge of the surrounding area toward the central area.

11. The light-adjusting film as claimed in claim 9, wherein spaced intervals between the microstructures of the at least one light-adjusting layer are gradually increased from the outer edge of the surrounding area toward the central area.

12. The light-adjusting film as claimed in claim 1, wherein the at least one light-adjusting layer is formed on the substrate by gel with pigments.

13. The light-adjusting film as claimed in claim 1, wherein the at least one light-adjusting layer is formed on the substrate by color printing.

14. A backlight module comprising:
    a housing;
    a light source mounted in the housing;
    a color conversion layer mounted in the housing and located at a front of the light source; and
    the light-adjusting film as claimed in claim 1 located at a front of the color conversion layer, wherein the pigment of the light-adjusting film has a color that is a correction color of lights emitted from the color conversion layer of in the backlight module.

15. The backlight module as claimed in claim 14, wherein the backlight module further comprises at least one optical film located at a front of the light-adjusting film.

16. A display device comprising:
the backlight module as claimed in claim 14; and
a display panel located at a front of the backlight module.

\* \* \* \* \*